United States Patent [19]
Tanaka et al.

[11] Patent Number: 5,003,383
[45] Date of Patent: Mar. 26, 1991

[54] COLOR IMAGE COPIER OPERABLE IN ANALOG AND DIGITAL MODES

[75] Inventors: Hironori Tanaka; Matahira Kotani; Masafumi Matsumoto, all of Nara, Japan

[73] Assignee: Sharp Kabushiki Kaisha, Osaka, Japan

[21] Appl. No.: 534,362

[22] Filed: Jun. 7, 1990

Related U.S. Application Data

[63] Continuation-in-part of Ser. No. 395,205, Aug. 16, 1989, abandoned, which is a continuation of Ser. No. 147,459, Jan. 5, 1988, abandoned.

[30] Foreign Application Priority Data

Feb. 18, 1987 [JP] Japan ............................ 62-23335[U]
Feb. 19, 1987 [JP] Japan ............................ 62-24564[U]
Feb. 19, 1987 [JP] Japan ................................ 62-38646
Feb. 19, 1987 [JP] Japan ................................ 62-38647

[51] Int. Cl.$^5$ ............................................. H04N 1/46
[52] U.S. Cl. .................................... 358/75; 358/471; 355/232
[58] Field of Search .................. 358/75, 80, 494, 471, 358/296, 300, 302, 474, 475; 346/108, 160; 355/67, 71, 232, 234, 244; 350/331 R

[56] References Cited

U.S. PATENT DOCUMENTS

| | | | |
|---|---|---|---|
| 4,128,850 | 12/1978 | Fischer, II | 358/284 |
| 4,178,093 | 12/1979 | Yanagawa et al. | 355/8 |
| 4,549,223 | 10/1985 | Ozawa | 358/300 |
| 4,632,538 | 12/1986 | Lemelson et al. | 355/14 R |
| 4,745,433 | 5/1988 | Fujimura et al. | 355/3 R |

FOREIGN PATENT DOCUMENTS 162174 12/1980 Japan .

*Primary Examiner*—Howard W. Britton
*Assistant Examiner*—Kim Yen Vu
*Attorney, Agent, or Firm*—Flehr, Hohbach, Test, Albritton & Herbert

[57] ABSTRACT

A color image copier operable both in analog and digital modes has a light source having a lamp and a screen with an opening. The screen is rotatable around the lamp so that light emitted from the lamp can be directed selectively to a color original or to a photosensitive film. Light reflected from the color original is received by an image reader which reads image data from the reflected light. The shutter transmits or screen light from the lamp selectively according to data read by this image reader.

11 Claims, 5 Drawing Sheets

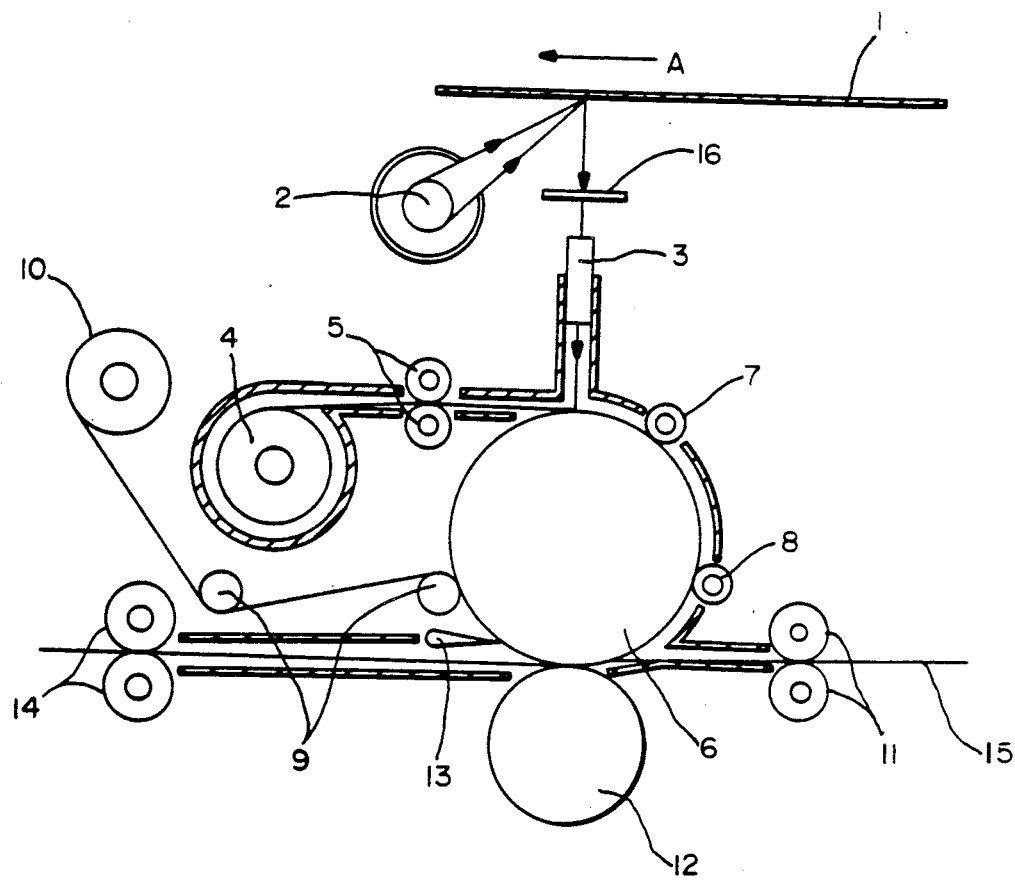
FIG.—1
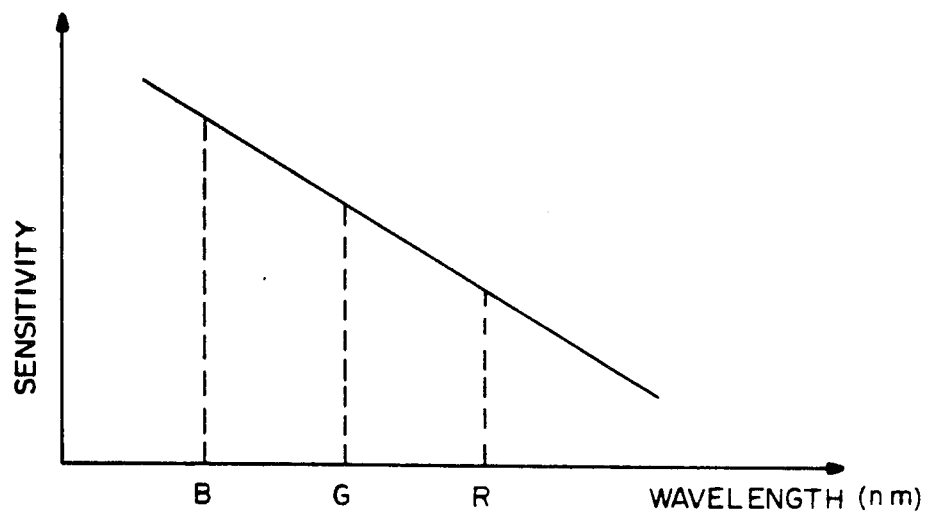
FIG.—5

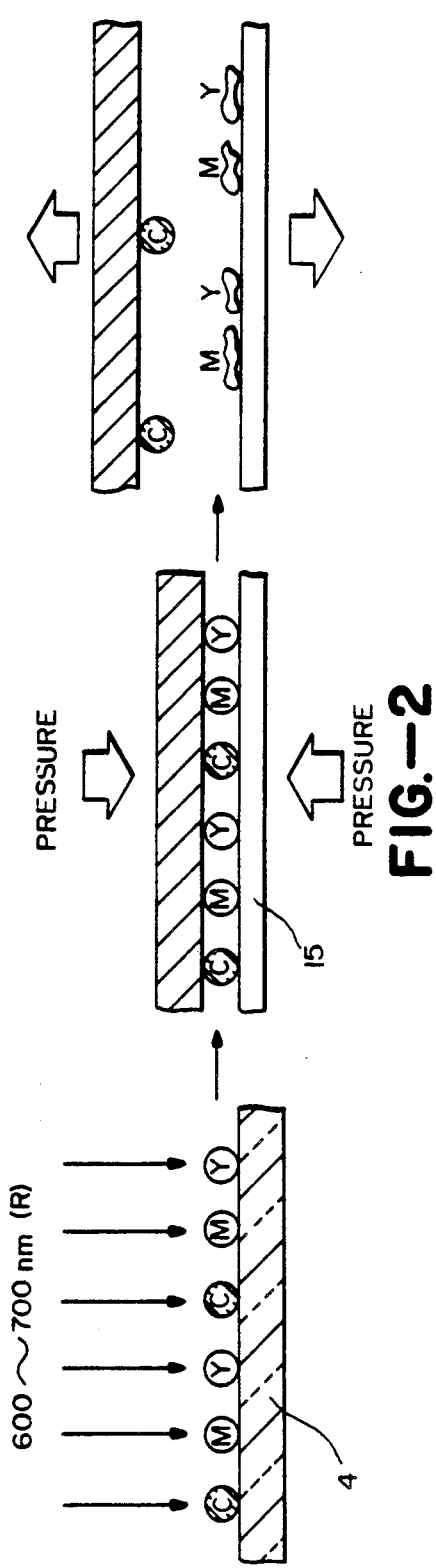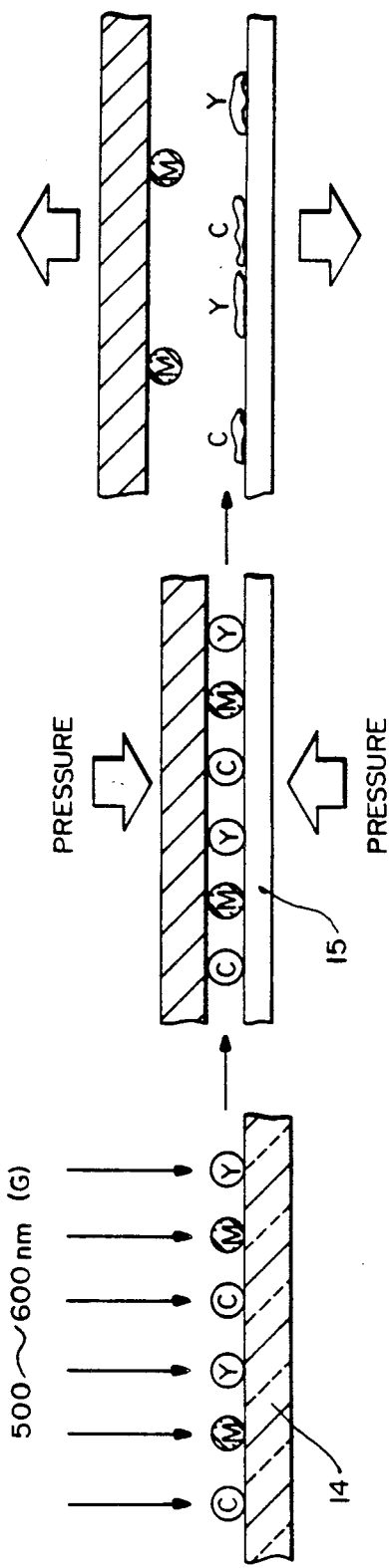

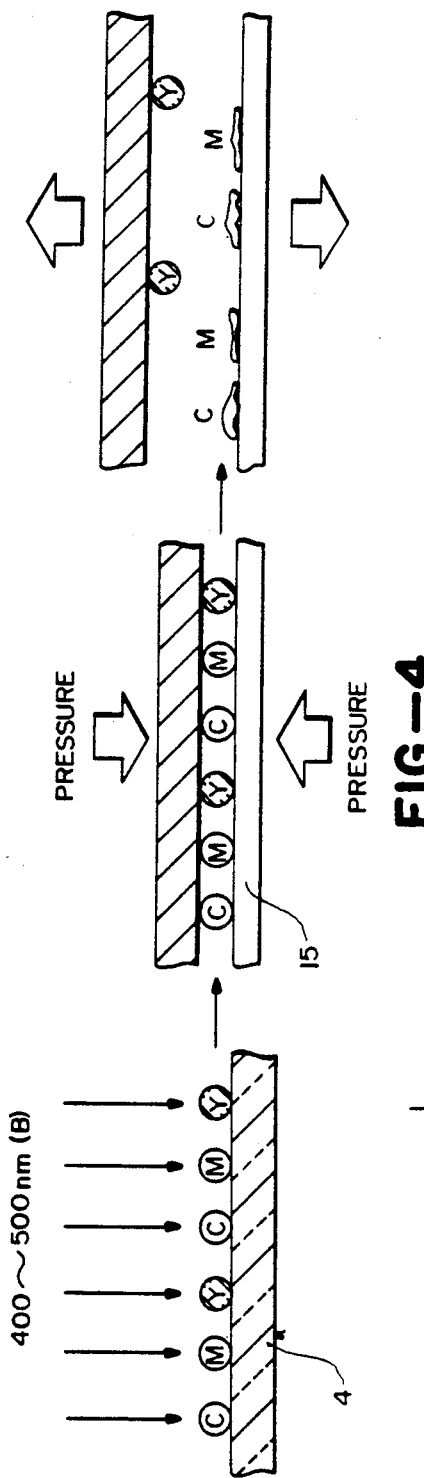
FIG.—4
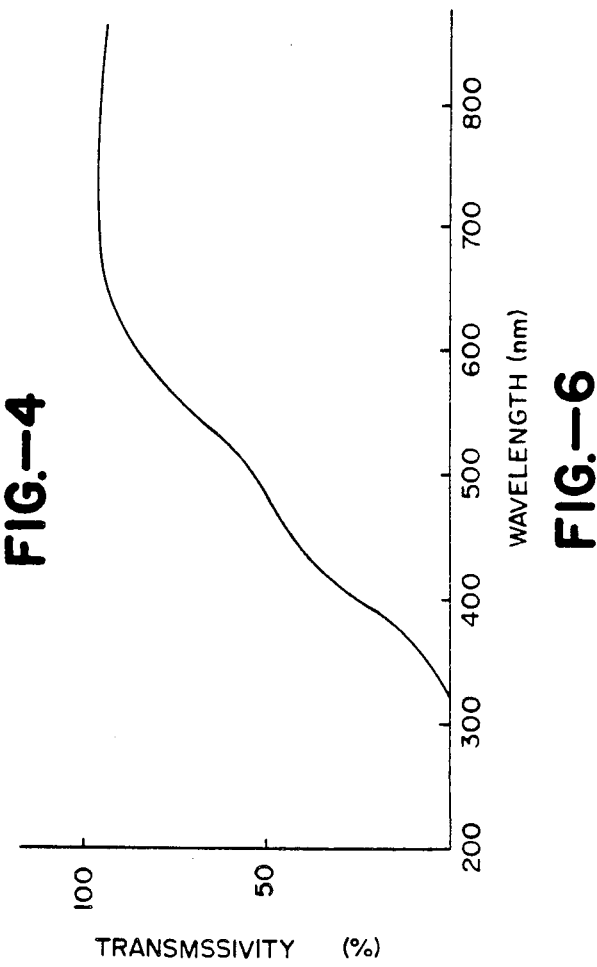
FIG.—6

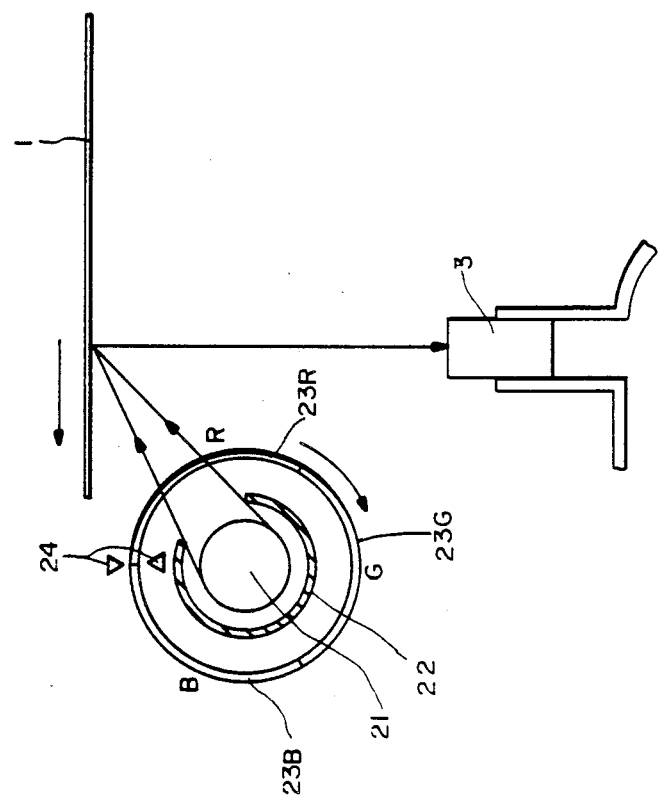
FIG.—9 (PRIOR ART)
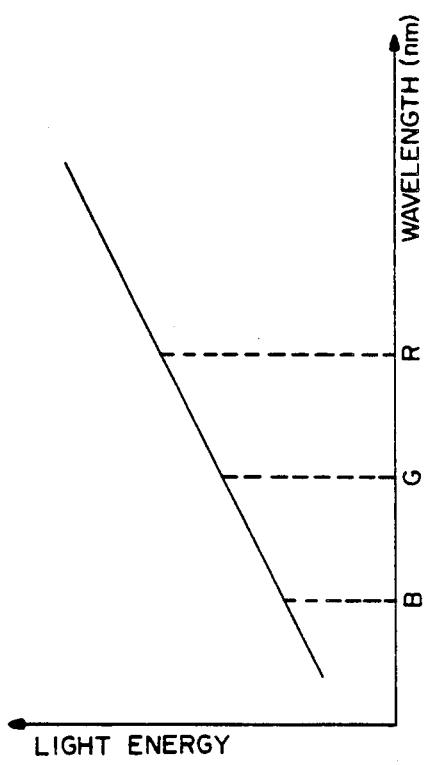
FIG.—7
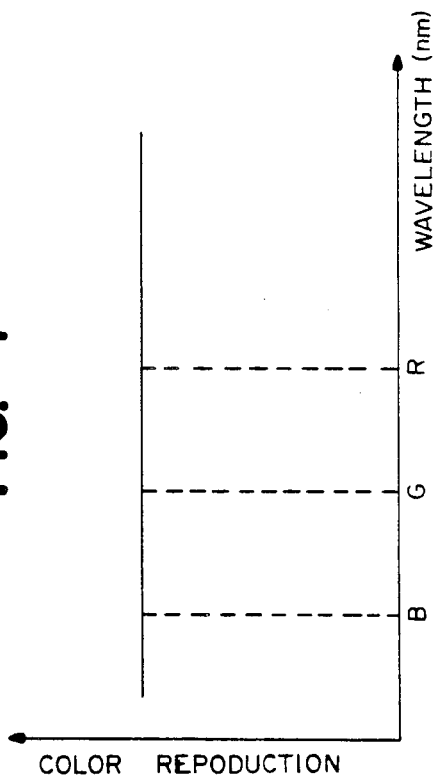
FIG.—8

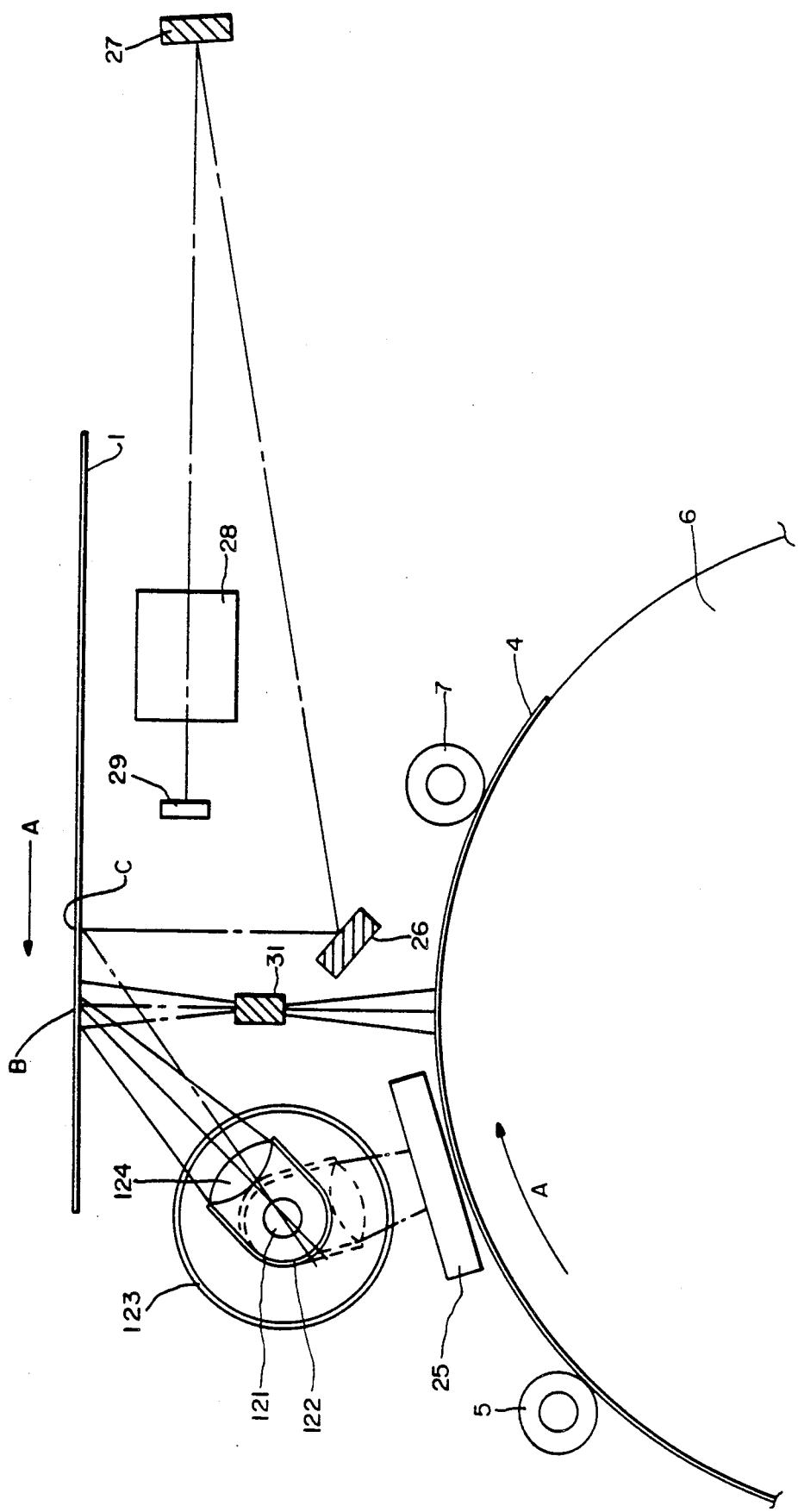
FIG.—10

COLOR IMAGE COPIER OPERABLE IN ANALOG AND DIGITAL MODES

This is a continuation-in-part of application Ser. No. 395,205 filed Aug. 16, 1989, to be abandoned, which is a continuation of application Ser. No. 147,459 filed Jan. 5, 1988, now abandoned.

BACKGROUND OF THE INVENTION

This invention relates to a color image copier with a simple structure capable of producing copies of improved color quality.

As disclosed, for example, in Japanese Patent Publication Tokkai 55-162174, a prior art copier of a color image typically exposes a color original sequentially to beams of light with different chromatographic radiation characteristics (such as red, green and blue), takes the reflected light into a CCD sensor by using a lens and mirrors, and obtains image data individually corresponding to these colors by sequentially taking them out in synchronism with the timing of light emission. Yellow, magenta, cyanic and black color data are created from these image data through a color conversion process and a color image is obtained by transferring color ink particles onto a sheet of printing paper by a thermal transfer recording method.

Color image copiers based on this general principle are inevitably complicated in structure, large in size and costly because there must be provided a red light source, a green light source, a blue light source, a control unit for controlling the timing of color light emission, a CCD image sensor, a control unit for controlling the charge timing, a color conversion processor, a thermal transfer recorder, yellow, magenta, cyanic and black ink ribbons, etc.

A prior art light source for a color image copier of analog image reading type is described next by way of FIG. 9 for the purpose of reference. In FIG. 9, numeral 21 indicates a light source such as a fluorescent lamp surrounded by a screen 22 for screening the light emitted from this source 21 to limit its optical path and a unistructurally formed cylindrical R, G and B rotary filter 23, and numeral 24 indicates a photosensor for detecting the revolution of the cylindrical filter 23, for example, by detecting a slit provided at one end of the filter 23. With a light source thus formed, the lamp 21 is lit up and the filter 23 begins to rotate at the beginning of a copying operation. The light from the source 21 is then passed through the R part of the filter 23R first and the reflected R beam from the original 1 is projected onto a film through the lens 3. Next, the light from the source 21 is passed through the G part of the filter 23G and the reflected G beam from the original 1 is projected onto the film. Then, the light from the source 21 is passed through the B part of the filter 23B and the B beam from the original is similarly projected onto the film. When the filter 23 completes one revolution and the exposure of the original 1 with R, G and B beams is completed, the photosensor 24 detects the end of a cycle of operation and a pulse motor is started in synchronism with this detection to transport the next original to be copied. The drum (not shown in FIG. 9 but reference may be made to FIG. 1) of the copier is also rotated by a predetermined angle and the copier starts the next cycle of copying operation.

Japanese Patent Publication Tokkai 55-162174, on the other hand, describes a digital color copier using a CCD image sensor to sequentially receive R, G and B beams of light with different chromatographic characteristics. With prior art copiers of the types described above, copying can be effected at an improved rate but editing operations such as image enlargements and reductions cannot be achieved. With conventional digital color copiers, furthermore, not only an image sensor but also a device for controlling the timing of emission of light in different colors, a color conversion device, etc. are required and the copier becomes complicated, large and more costly. Moreover, light-emitting units of the conventional type described above are not efficient because light is projected directly onto the original and hence tends to disperse. The present invention is also addressed to such drawbacks of prior art color copiers.

SUMMARY OF THE INVENTION

It is therefore an object of the present invention to eliminate these drawbacks of prior art color image copiers by providing a new type of color image copier not requiring a plurality of light sources or a CCD image sensor.

It is another object of the present invention to provide a color image copier which enables a photosensitive film to exhibit uniform color reproducibility independently of differences in wavelength.

It is still another object of the present invention to provide a new color image copier which reads color data digitally.

It is a further object of the present invention to provide a new color image copier which can operate in both an analog mode and digital mode.

It is a still further object of the present invention to provide a new color image copier with an improved light emitting system capable of projecting a light beam efficiently on a sheet of copy paper.

The present invention teaches the use of a filter in the optical path between the light source and the photosensitive film such that the transmissivity of light can be adjusted corresponding to different ranges of wavelength. In another aspect, the present invention relates to a color image reader with an improved light source provided with a rotatable screen with an opening around a lamp and a converging lens near this opening for converging the light from the source to be projected onto the film. An image reader reads image data from the light reflected from an original and a shutter is provided for selectively allowing or not allowing the light from the lamp to pass to the film and this selection is made according to the image data received by the image reader.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings:

FIG. 1 is a drawing schematically showing the structure of a color copier embodying the present invention, FIGS. 2, 3 and 4 are drawings showing the basic principle of a photosensitive film used in connection with the present invention, FIG. 5 is a schematic graph showing the sensitivity characteristic of a photosensitive film, FIG. 6 is a schematic graph showing the transmissivity characteristic of the filter shown in FIG. 1, FIG. 7 is a schematic graph showing the chromatographic distribution characteristic of light from the source after it passes through the filter, FIG. 8 is a schematic graph showing the color reproducibility of light made incident onto the filter, FIG. 9 is a schematic drawing showing the structure of a light source for a prior art copier, and FIG. 10 is a drawing schematically showing the structure of a portion of another color copier embodying the present invention.

DETAILED DESCRIPTION OF THE INVENTION

With reference to FIG. 1 which shows the overall structure of a color image copier embodying the present invention, numeral 1 indicates a color original to be read (for copying) and adapted to be transported in the direction of the arrow A in an intermittent motion by means, for example, of a pulse motor, numeral 2 indicates a light source, numeral 3 indicates a lens for converging the light reflected from the color original 1 and directing it to a photosensitive film 4 which is wound in the form of a roll and is adapted to be transported by film rollers 5, 7, 8 and 9 and to be taken up by a take-up roller 10, numeral 6 indicates a drum which serves as a fixing roller and is adapted not only to hold the photosensitive film 4 at a set position for exposure but also to transport the exposed film to the next position for fixing operation, numeral 11 indicates paper supply rollers for delivering to the fixing position a sheet of recording paper 15 on which a color image is recorded, numeral 12 indicates a principal fixing roller for applying a pressure on the exposed film 4 and a recording sheet 15 against the drum 6 such that the color data on the film 4 are transferred onto the paper 15, numeral 13 indicates a blade piece for forcibly separating the recording paper 15 from the film 4 to which it became attached by the compressive fixing process, numeral 14 indicates paper discharge rollers for discharging printed recording sheets, and numeral 16 indicates a transparent filter with the characteristic of having higher transmissivity for beams with longer wavelengths.

Next, the fundamental principles of the photosensitive film 4 are explained by way of FIGS. 2, 3 and 4 which show the situations in which a red (R) beam of light having wavelengths in the range of 600 nm–700 nm, a green (G) beam of light in the range of 500 nm–600 nm, and a blue (B) beam of light in the range of 400 nm–500 nm are respectively made incident onto the film 4. The photosensitive film 4 is coated with Y (yellow), M (magenta) and C (cyanic) ink particles which harden by exposure to light in different ranges of wavelength. Specifically, C ink particles harden by the R light, M ink particles harden by the G light and Y ink particles harden by the B light. If the film 4 is exposed to a beam of R light as shown in FIG. 2, C ink particles become hardened and if the film 4 is thereafter placed against a recording sheet and a pressure of about 350 kg/cm$^2$ is applied onto both of them from both sides thereof, M and Y ink particles which did not become hardened by the exposure to the R light are crushed and attached to the recording sheet, appearing red together. If the film 4 is exposed to a beam of G light as shown in FIG. 3, the M ink particles are hardened such that C and Y ink particles are crushed together to present a green color. If the film 4 is exposed to a beam of B light as shown in FIG. 4, the Y ink particles are hardened such that C and M ink particles are crushed to present a blue color. Thus, if reflected R, G and B beams of light from each unit area of the color original 1 are sequentially made incident on the same unit area of the film 4, the ink particles of different colors coating the film 4 become sequentially hardened. A full-color image is thereby obtained as the result.

As shown in FIG. 5 which illustrates the photosensitivity characteristic of the film 4, the film 4 is less sensitive to light of longer wavelengths. This means that beams of R, G and B light have different optical characteristics and, for example, that a B beam has a faster rise (response) time than G and R beams. It is necessary, however, that the rise times corresponding to different colors of light be uniform. This is why the transparent filter 16 is provided according to the present invention.

As seen in FIG. 6 which shows the transmissivity characteristic of the filter 16, this filter 16 transmits about 40 percent of B light, 70 percent of G light and 90 percent of R light. Thus, the chromatographic distribution from the light source 2 is as shown in FIG. 7 after it passes through the filter 16 and the color reproducibility of the light incident onto the film 4 becomes uniform as shown in FIG. 8. In summary, the present invention discloses the use of a filter 16 through which the film 4 is exposed to the light from the source 2 such that color reproducibility can be made uniform independently of the differences in wavelength and hence that copies can be obtained with colors which are closer to those on the original 1.

With reference to FIG. 10 which shows a relevant part of another color copier embodying the present invention and wherein components which are substantially identical or at least similar to those already described are indicated by the same numerals, numeral 121 indicates a light source such as a halogen lamp, numeral 122 indicates a rotatable screen which has a mirror on the inner peripheral surface and opens in the direction of radiation, numeral 124 indicates a converging lens which is disposed at the opening part of the screen 122 and is adapted to collect the light emitted from the source 121 to increase the amount of energy projected onto the original 1 or a liquid crystal shutter 25, numeral 123 indicates an RGB filter having R, G and B filter parts and adapted to make one revolution corresponding to the motion of the original 1 by a unit distance or one line of color image radiation controlled by the liquid crystal shutter 25, numeral 31 indicates a fiber lens for conducting the reflected light from the original 1 to the film 4, numerals 26 and 27 indicate mirrors for leading reflected light from a specified position on the exposed original 1 to a CCD image sensor 29 when a color image is being read digitally, and numeral 28 indicates a converging lens for converging the reflected light from the aforementioned mirrors 26 and 27. The CCD image sensor 29 is adapted to receive the reflected light and to read data on each line of an image for each color component. The liquid crystal shutter 25 screens the light from the source 121 or allows it to pass on the basis of image data. Numeral 161 indicates an operator's panel (input means) provided with a mode selection switch by means of which a user can select a mode of operation such as analog copying and digital copying. Numeral 163 indicates a motor for rotating the screen 122 and numerals 164a, 164b and 164c are sensors for detecting the orientation of the screen, or detecting whether the light from the lamp 121 will be directed towards the position indicated by letter C, towards the shutter 25 or the position indicated by letter B, respectively.

With a portion of the copier thus structured, analog copying and digital image processing can be selectively carried out. These processes are explained below.

ANALOG COPYING

The basic operation for analog copying of a color image was already described above. With reference to FIG. 10, if the mode selection switch is operated to select the analog copying mode of operation, a motor control 162 controls the motor 163 such that the screen 122 is rotated so as to assume the position indicated by solid lines, the lamp 121 is switched on and the light therefrom is projected through the lens 124 and the RGB filter 123 onto predefined position B on the original 1. The reflected beam is projected through the fiber lens 31 onto the film 4. This operation is repeated until the RGB filter 123 completes one revolution and as soon as its completion of one revolution is detected, both the original 1 and the drum 6 are moved in the directions of the arrows A by a predetermined distance. This operation is thereafter repeated and the film 4 is exposed sequentially to the R, G and B beams of light from the original 1.

DIGITAL IMAGE READING The image on the original 1 is digitally read when the light from the source 121 is received at another predefined position C on the original 1. In other words, if the mode selection switch on the panel 161 is operated to select the digital image reading mode of operation, the motor control 162 controls the motor 163 and rotates the screen 122 until the sensor 164a detects that the opening of the screen 122 is directed in the direction of the position C. For simplicity, however, this new position of the screen 122 is not illustrated.

If the screen 122 is so rotated as to direct the light from the source 121 to the position C, the reflected light therefrom is directed by the mirrors 26 and 27 to the converging lens 28 and received by the CCD image sensor 29. This CCD image sensor 29 is further adapted to control the retrieval of image data according to the rotation of the RGB filter 123. In other words, the CCD image sensor 29 is so controlled that the image data received when the RGB filter 23 is at a position for projecting an R beam of light are retrieved as R image data, that those image data received when it is rotated to a position for projecting a G beam of light are retrieved as G image data and that those received when it is rotated to a position for projecting a B beam of light are retrieved as B image data. After the R, G and B components of an image corresponding to a unit area on the original 1 are thus read, the original 1 is moved in the direction of the arrow A by a specified distance. This reading operation is repeated thereafter and the R, G and B image data thus retrieved by the CCD image sensor 29 are sequentially stored in an image memory shown schematically in FIG. 10 at 151 and later serve as control data for the liquid crystal shutter 25 as will be explained below. Alternatively, these R, G and B image data may be outputted to a separate apparatus external to this copier.

DIGITAL RECORDING METHOD

For digital recording of a color image, the screen 122 is rotated by the motor 163 controlled by the motor control 162 until the sensor 164b detects that the screen 122 has reached the orientation shown by broken lines RGB filter 123 begins to rotate as described above, the light from the source 121 first passes through the R filter and reaches the liquid crystal shutter 25 as an R beam. When this R beam is received, the liquid crystal shutter 25 is controlled by a screen control means 152 to project an R beam of light on the film 4 according to the aforementioned R image data received by the CCD image sensor 29 and stored in the image memory 151. A G beam of light through the G filter and a B beam of light through the B filter are thereafter sequentially projected similarly onto the same position where the R beam of light was projected.

When the exposure of an area on the film 4 by R, G and B beams of light is completed as described above, the drum 6 is rotated in the direction of the arrow A by a predetermined angle and the exposure of the film 4 to R, G and B beams is repeated. Digital recording of a color image is thus accomplished by repeating this process. An enlarged or reduced image can be produced if the image data received by the CCD image sensor 29 are edited before they are supplied to the liquid crystal shutter 25. It goes without saying that image data other than those received by the CCD image sensor 29 may alternatively be supplied to the liquid crystal shutter 25 from an external apparatus.

In summary a copier thus formed can be sued both as an analog copier and as a digital copier. A user, therefore, might select from the control panel 161 the analog mode of operation if high-speed copying is desired and the digital mode if it is desired to edit the image. If the digital mode is selected by the mode selection switch on the panel 161, as explained above, the motor 163 is driven first until the sensor 164a detects the opening of the screen 122 and the CCD image sensor 29 reads an image as digital data. After the reading is completed, the motor 163 is driven next until the sensor 164b detects that the opening of the screen 122 faces the shutter 25. The lamp 121 is then switched on and the shutter control 152 controls the shutter 25 according to the digital data for an exposure. Since a shutter is used for producing an image on the film, the light from the source can be projected more efficiently and there is no need for a color conversion processor, a thermal transfer recorder or ink ribbons of different colors. Thus, the copier according to the present invention has a simple structure, can be made smaller and less expensive. If the original is a pictorial image formed by digital data, it is preferable to select the analog copying mode of operation in order to prevent the occurrence of moire.

The foregoing description of preferred embodiments of the invention has been presented for purposes of illustration and description. It is not intended to be exhaustive or to limit the invention to the precise form disclosed, and many modifications and variations are possible in light of the above teaching. Such modifications and variations that may be apparent to a person skilled in the art are intended to be included within the scope of this invention.

What is claimed is:

1. A color image copier comprising
   light-emitting means for emitting light selectively at least in a first direction to a color original and in a second direction to a photsensitive film,
   image reader means for reading image data from reflected light from said color original, and
   shutter means capable of selectively transmitting or screening light from said light-emitting means to said photosensitive film according to data read by said image reader means, said light-emitting means including a light source and a screen, said screen having an opening and being disposed rotatably around said light source such that said opening can be oriented selectively in said first and second directions.

2. The color image copier of claim 1 wherein said image reader means include a CCD image sensor.

3. The color image copier of claim 1 wherein said shutter means include a liquid crystal shutter.

4. The color image copier of claim 1 wherein said shutter means include a liquid crystal shutter.

5. A color image copier comprising
light-emitting means for projecting light on a color original,
focusing means for focusing reflected light from said original on a photosensitive film,
image reader means reading image data from reflected light from said original,
shutter means for selectively passing or screening light from light-emitting means to said photosensitive film on the basis of data read by said image reader means, and
selection control means for selecting whether reflected light from said original is transmitted to said focusing means or to said image reader means.

6. The color image copier of claim 5 wherein said selection control means includes rotatably disposed screening means for direction light from said light-emitting means selectively to said image reader means or to said shutter means.

7. The color image copier of claim 5 wherein said image reader means include a CCD image sensor.

8. The color image copier of claim 5 wherein said shutter means include a liquid crystal shutter.

9. A color image copier comprising
light-emitting means for emitting light selectively at least in a first direction to a color original and in a second direction to a photosensitive film,
image reader means for reading image data from reflected light from said color original, and
shutter means for selectively transmitting or screening light from said light-emitting means to said photosensitive film, said light-emitting means including a light source and a screen, said screen having an opening and being disposed rotatably around said light source such that said opening can be oriented selectively in said first and second directions.

10. The color image copier of claim 9 wherein said image reader means include a CCD image sensor.

11. The color image copier of claim 9 wherein said shutter means include as liquid crystal shutter.

* * * * *